(12) United States Patent
Reynolds

(10) Patent No.: US 10,315,474 B2
(45) Date of Patent: Jun. 11, 2019

(54) TRAILER HITCH ATTACHMENT DEVICE

(71) Applicant: Robert Reynolds, Spruce, MI (US)

(72) Inventor: Robert Reynolds, Spruce, MI (US)

( * ) Notice: Subject to any disclaimer, the term of this patent is extended or adjusted under 35 U.S.C. 154(b) by 609 days.

(21) Appl. No.: 14/921,662

(22) Filed: Oct. 23, 2015

(65) Prior Publication Data

US 2017/0113501 A1    Apr. 27, 2017

(51) Int. Cl.
*B60D 1/52* (2006.01)
*B60D 1/58* (2006.01)
*B60D 1/60* (2006.01)

(52) U.S. Cl.
CPC ............... *B60D 1/52* (2013.01); *B60D 1/58* (2013.01); *B60D 1/60* (2013.01)

(58) Field of Classification Search
CPC .................................... B60D 1/52; B60D 1/06
USPC .......................................................... 280/504
See application file for complete search history.

(56) References Cited

U.S. PATENT DOCUMENTS

| | | | |
|---|---|---|---|
| 1,448,950 A | 3/1923 | Uecker | |
| 3,077,248 A * | 2/1963 | Wayt | B60T 11/107 188/112 R |
| 4,042,256 A * | 8/1977 | Lepp | B60D 1/065 280/512 |
| 4,778,196 A | 10/1988 | Spoliansky | |
| 4,802,686 A | 2/1989 | Isreal | |
| 5,308,100 A * | 5/1994 | Heider | B60D 1/40 280/474 |
| 5,997,025 A * | 12/1999 | Wisecarver | B60D 1/00 280/508 |
| D570,257 S | 6/2008 | VanderBurgh et al. | |
| 7,434,826 B1 * | 10/2008 | Lambros | B60D 1/065 280/477 |
| 8,201,844 B1 | 6/2012 | Smoot | |
| 8,490,999 B2 | 7/2013 | Scott | |
| 8,925,954 B2 * | 1/2015 | Williams, Jr. | B60D 1/36 280/477 |
| 2007/0257470 A1* | 11/2007 | Konsela | B60D 1/02 280/504 |
| 2009/0072516 A1* | 3/2009 | Kuenzel | B60D 1/065 280/477 |
| 2010/0140900 A1* | 6/2010 | Zinn | B60D 1/06 280/477 |
| 2011/0037242 A1* | 2/2011 | Hensley | B60D 1/065 280/477 |
| 2013/0033021 A1 | 2/2013 | Prescott | |
| 2014/0028000 A1 | 1/2014 | Lachance | |

* cited by examiner

*Primary Examiner* — Jacob D Knutson

(57) ABSTRACT

A trailer hitch attachment device for securing a trailer hitch to a hitch receiver includes a collar that comprises a tube. A channel defining an upper guide and a lower guide is positioned in each of a pair of alignment blocks coupled to a left side and a right side of the tube. A latch with a pair of biasers and a pair of extractors coupled to an inside surface is hingedly coupled to the tube. Each of a pair of pins with a curved end, an actuator end, and a pivot hole is positioned in an associated one of the channels with the curved ends extending toward the tube and with the actuator ends positioned proximate to a back end of the tube. A pair of pivots is coupled to and extends from an associated one of the upper guides, through an associated one of the pivot holes and is coupled to an associated one of the lower guides.

29 Claims, 7 Drawing Sheets

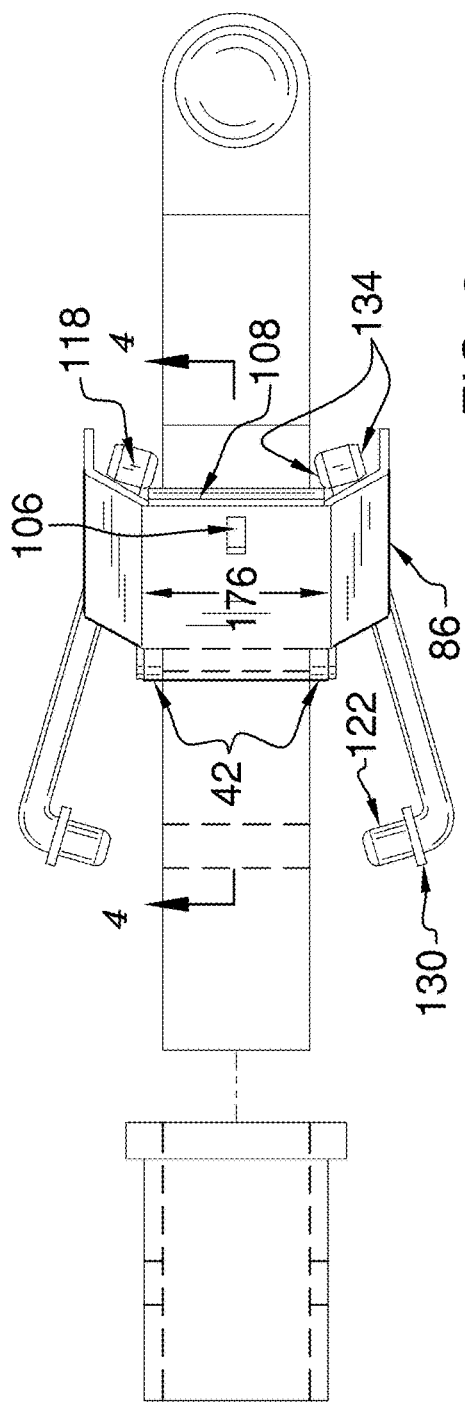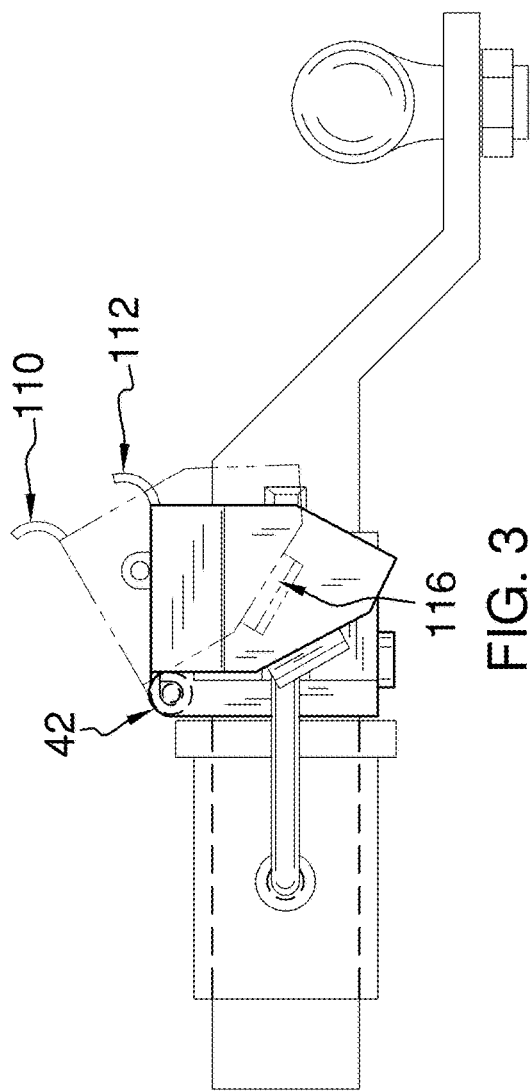

TRAILER HITCH ATTACHMENT DEVICE

BACKGROUND OF THE DISCLOSURE

Field of the Disclosure

The disclosure relates to attachment devices and more particularly pertains to a new attachment device for securing a trailer hitch to a hitch receiver.

SUMMARY OF THE DISCLOSURE

An embodiment of the disclosure meets the needs presented above by generally comprising a collar that comprises a tube. A channel defining an upper guide and a lower guide is positioned in each of a pair of alignment blocks coupled to a left side and a right side of the tube. A latch with a pair of biasers and a pair of extractors coupled to an inside surface is hingedly coupled to the tube. Each of a pair of pins with a curved end, an actuator end, and a pivot hole is positioned in an associated one of the channels with the curved ends extending toward the tube and with the actuator ends positioned proximate to a back end of the tube. A pair of pivots is coupled to and extends from an associated one of the upper guides, through an associated one of the pivot holes and is coupled to an associated one of the lower guides.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a top view of an embodiment of the disclosure.

FIG. 3 is a side view of an embodiment of the disclosure.

DESCRIPTION OF THE PREFERRED EMBODIMENT

Figure 1:
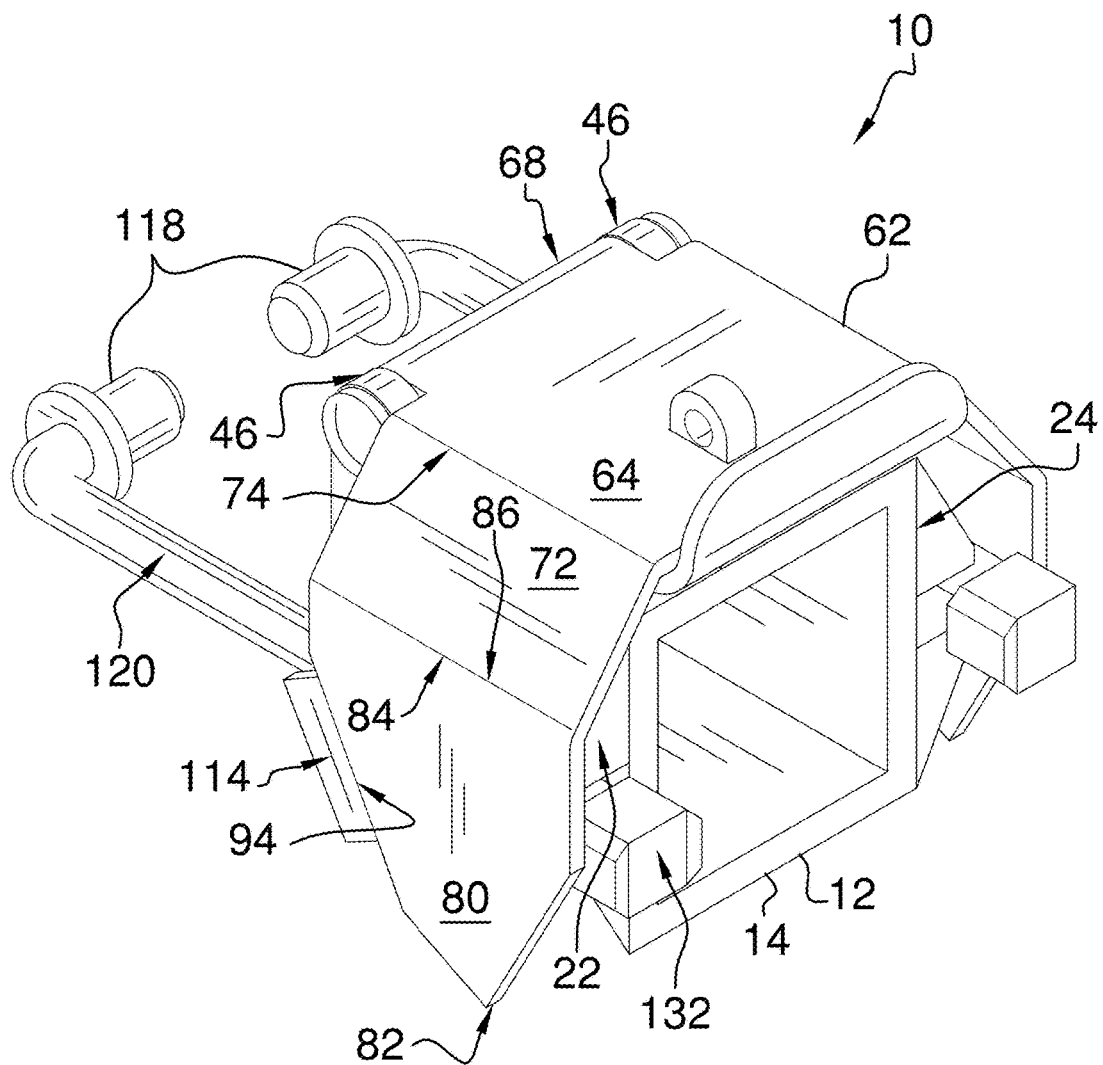
FIG. 1 is an isometric perspective view of a trailer hitch attachment device according to an embodiment of the disclosure.
Figure 4:
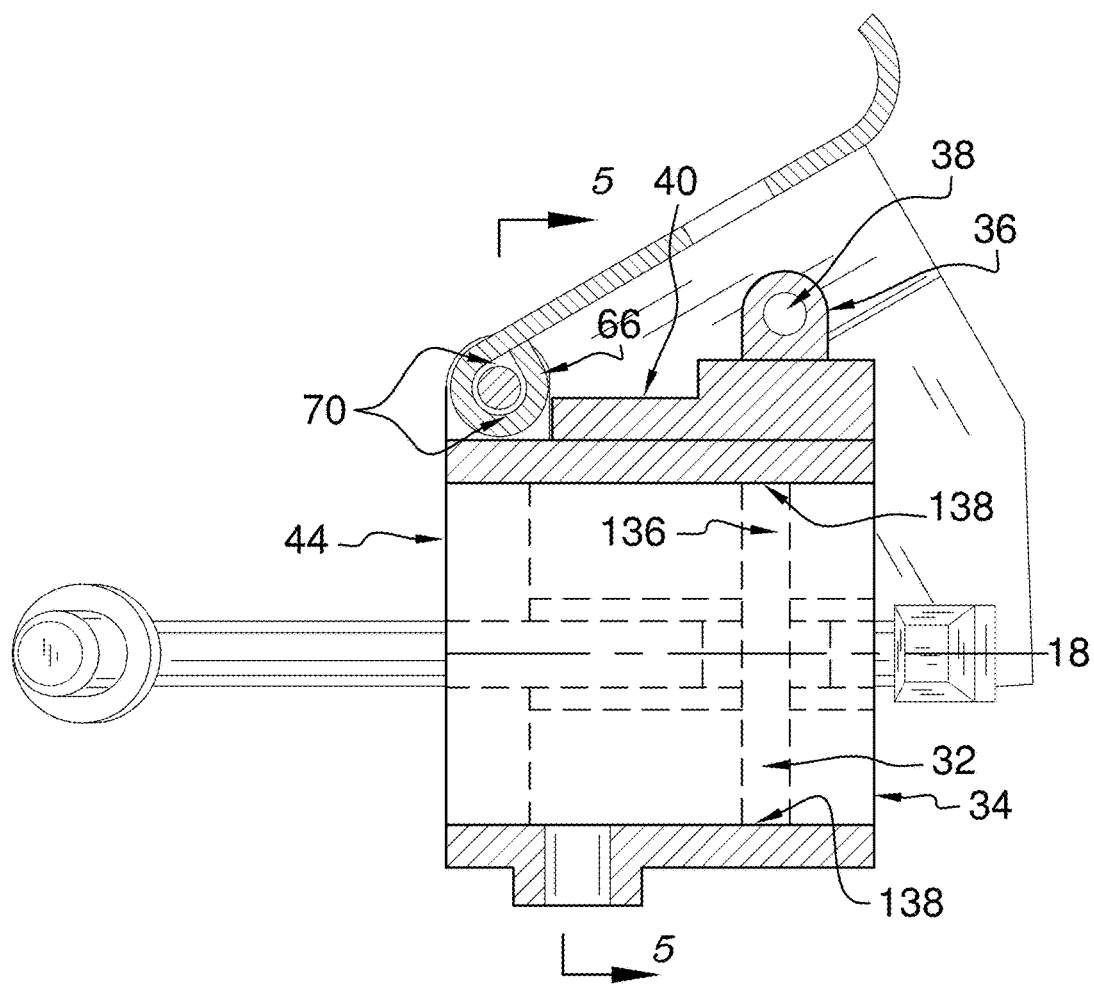
FIG. 4 is a side cut-away view of an embodiment of the disclosure.
Figure 5:
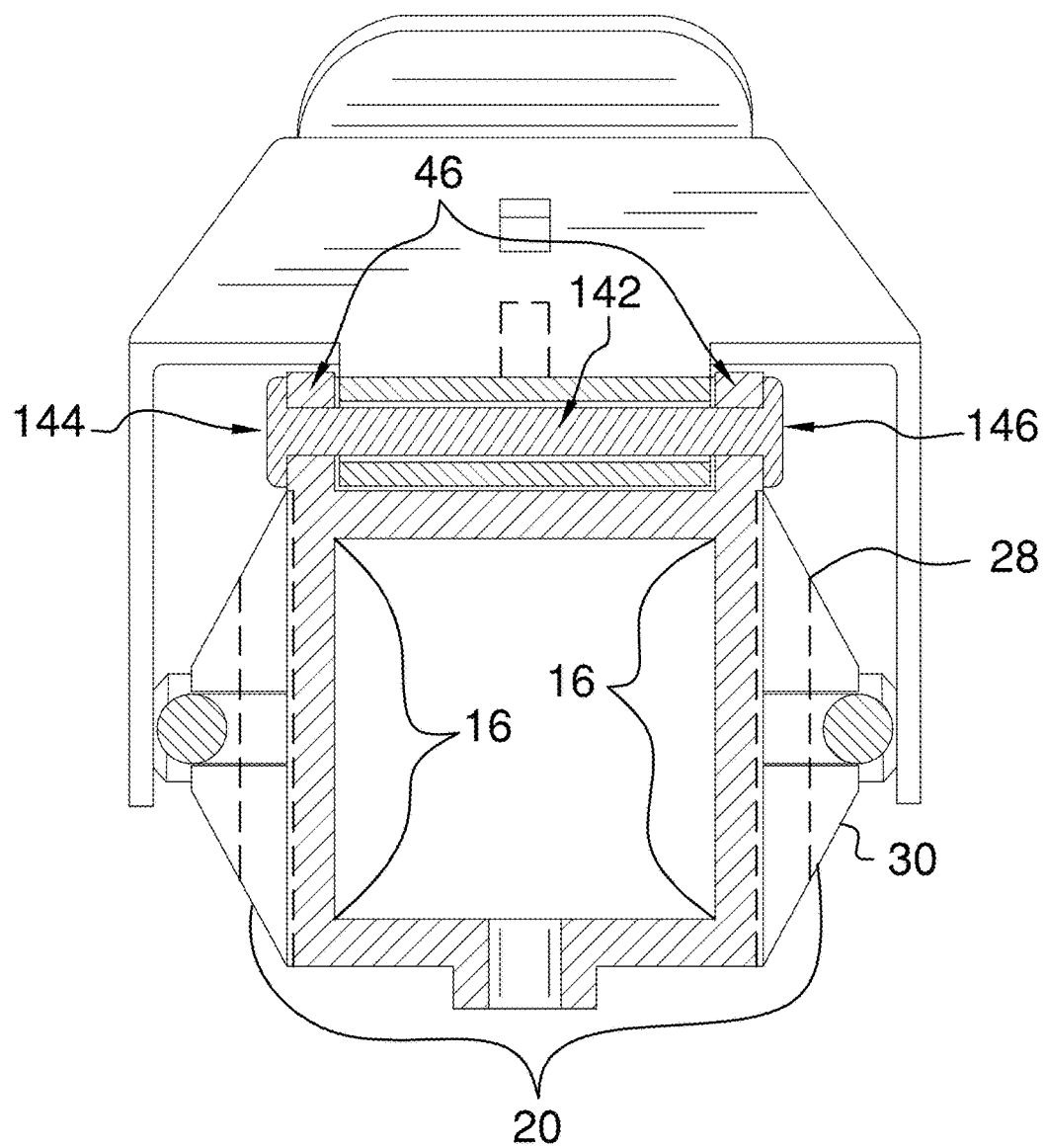
FIG. 5 is a front cut-away view of an embodiment of the disclosure.
Figure 6:
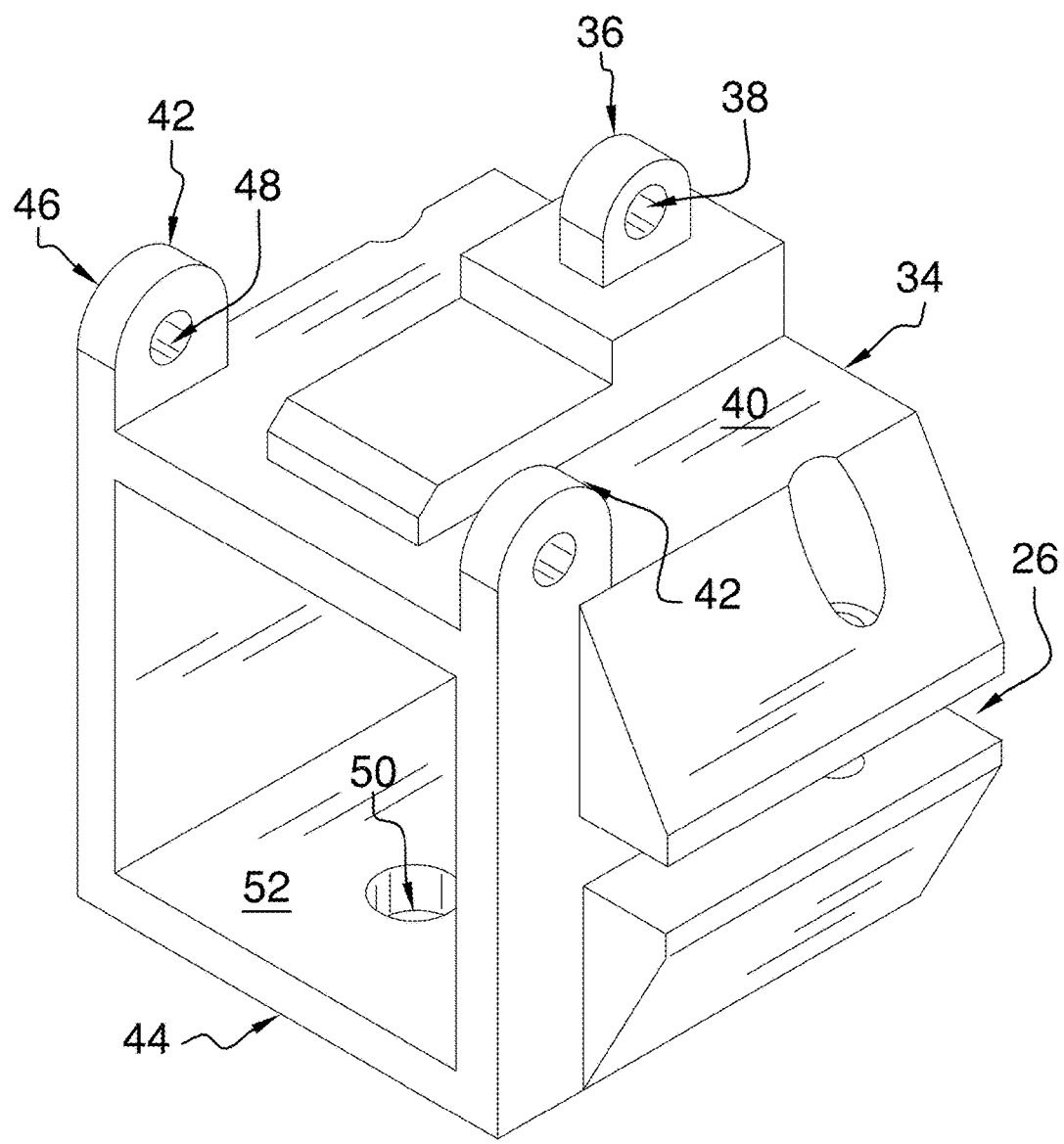
FIG. 6 is an isometric perspective view of an embodiment of the disclosure.
Figure 7:
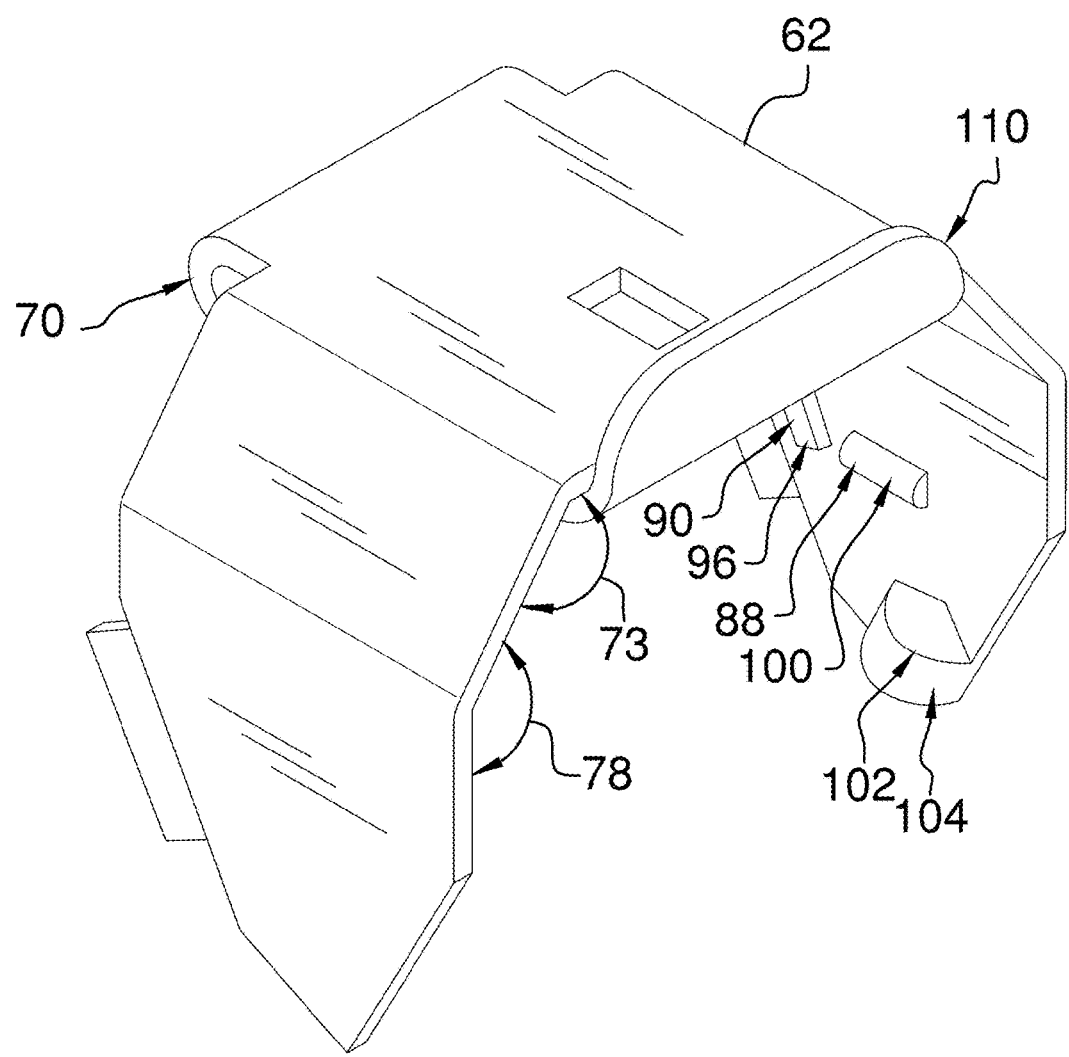
FIG. 7 is an isometric perspective view of an embodiment of the disclosure.
Figure 8:
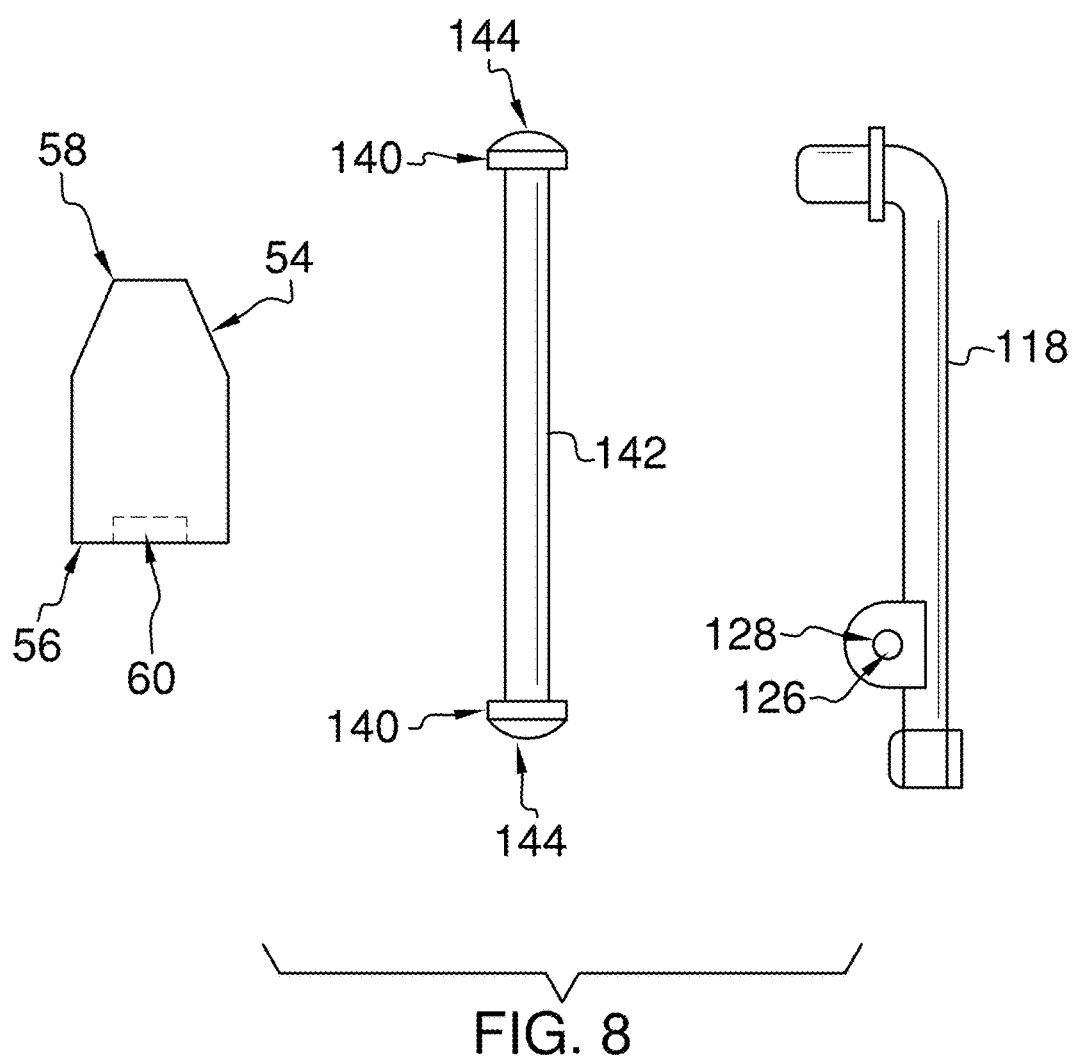
FIG. 8 is an exploded view of an embodiment of the disclosure.

With reference now to the drawings, and in particular to FIGS. 1 through 8 thereof, a new attachment device embodying the principles and concepts of an embodiment of the disclosure and generally designated by the reference numeral 10 will be described.

As best illustrated in FIGS. 1 through 8, the trailer hitch attachment device 10 generally comprises a collar 12. The collar 12 comprises a tube 14 that has a square profile 16 when viewed along a longitudinal axis 18. One of each of a pair of alignment blocks 20 is coupled to a left side 22 and a right side 24 of the tube 14. Each of the pair of alignment blocks 20 has a channel 26 parallel to the longitudinal axis 18. The channels 26 define an upper guide 28 and a lower guide 30. Each of the pair of alignment blocks 20 has a penetration 32 perpendicular to the channels 26. The penetrations 32 are proximate to a back end 34 of the tube 14. A tab 36 with an opening 38 is coupled to and positioned on a top 40 of the tube 14 proximate to the back end 34. A first coupler 42 is coupled to and positioned on the top 40 of the tube 14 proximate to a front 44 of the tube 14. The first coupler 42 is a pair of protections. Each of the pair of projections 46 has an orifice 48. The collar 12 may be comprised of a single piece of steel. Preferably, the collar 12 is comprised of a single piece of hardened steel. A hole 50 that is threaded is positioned in a bottom 52 of the tube 14. A screw 54, complimentary to the hole 50, is positioned in the hole 50. The screw 54 has a head 56, and a tail 58 that is threaded. The head 56 has a hexagonally shaped indentation 60.

A latch 62 comprising a plate 64 is hingedly coupled to the tube 14. The plate 64 is flat. A second coupler 66 that is complimentary to the first coupler 42 is coupled to a hinge edge 68 of the plate 64. The hinge edge 68 may be a tubular extension 70 of the plate 64 that is complimentary to the orifices 48 of the pair of projections 46. A pair of transitions 72 that is flat and has an inside edge 74 is coupled to the plate 64. Each of the inside edges 74 are coupled to an associated one of a pair of opposing edges 76 of the plate 64. Preferably, each of the pair of transitions 72 is coupled to an associated one of the pair of opposing edges 76 at a 55 degree angle 78 relative to the plate 64, such that the pair of transitions 72 extends toward the bottom 52 of the tube 14. One of each of a pair of wings 80 is coupled to an associated one of the pair of transitions 72. Each of the pair of wings 80 is flat and has a triangular end 82 and a straight end 84. Each of the straight ends 84 is coupled to an associated one of a pair of outside edges 86 of the pair of transitions 72 at a 35 degree angle 73 relative to the transition, such that the pair of wings 80 extends toward the bottom 52 of the tube 14 perpendicularly to the plate 64.

One of each of a pair of biasers 90 is coupled to an inside surface 92 of an associated one of the pair of wings 80. Each of the pair of biasers 90 is half-cylindrically shaped and is positioned parallel to an associated one of a front rim 94 of the pair of wings 80. The pair of biasers 90 comprises a first set of extrusions 96 protruding from the inside surface 92.

One of each of a pair of locks 98 is coupled to the inside surface 92 of an associated one of the pair of wings 80. The pair of locks 98 is half-cylindrically shaped. Each of the pair of locks 98 is positioned on the inside surface 92 parallel to the straight end 84. The pair of locks 98 comprises a second set of extrusions 100 protruding from the inside surface 92.

One of each of a pair of extractors 102 is coupled to the inside surface 92 of an associated one of the pair of wings 80. The pair of extractors 102 is half-cylindrically shaped. Each of the pair of extractors 102 is positioned on the inside surface 92 proximate to an associated one of the triangular ends 82. The pair of extractors 102 comprises a third set of extrusions 104 protruding from the inside surface 92.

The latch 62 may be comprised of a single piece of steel. Preferably, the latch 62 is comprised of a single piece of hardened steel.

A slot 106, complimentary to the tab 36, is positioned in the plate 64 proximate to a rear edge 108 of the plate 64. The slot 106 is parallel to the longitudinal axis 18, such that the slot 106 is positioned to accept the tab 36 when the latch 62 is in a closed position, and such that the opening 38 in the tab 36 is positioned to accept a keeper or lock to secure the latch 62 in a closed position.

A handle 110 is coupled to the rear edge 108 the plate 64. Preferably, the handle 110 is an arcuate extension 112 of the plate 64 that extends away from the top 40, such that the handle 110 is positioned to facilitate movement of the latch 62 to a closed position.

One of each of a pair of pulls 114 is coupled to the front rim 94 of an associated one of the pair of wings 80. The pair of pulls 114 comprises extensions 116 of the pair of wings 80, such that the pair of pulls 114 is positioned to facilitate movement of the latch 62 to an open position.

Each of a pair of pins 118 having a cylindrical body 120, a curved end 122, an actuator end 124, and a pivot hole 126 is positioned in an associated one of the channels 26 with the curved ends 122 extending toward the tube 14 and with the actuator ends 124 positioned proximate to the back end 34. The curved end 122 is tapered and perpendicular to the cylindrical body 120. The pivot hole 126 comprises a loop 128 coupled proximate to the actuator end 124 and extending from the cylindrical body 120 away from the curved end 122. Each of the pair of pins 118 has a stop 130 positioned proximate to the curved end 122. The actuator end 124 comprises a block 132 coupled to the cylindrical body 120. The block 132 has an opposing pair of tapered faces 134. Each of the pair of pins 118 may be comprised of a single piece of steel. Preferably, each of the pair of pins 118 is comprised of a single piece of hardened steel.

A pair of pivots 136 that is cylindrical is coupled to and extends from an associated one of the upper guides 28, through an associated one of the pivot holes 126 and is coupled to an associated one of the lower guides 30. Each of the pair of pivots 136 has a pair of termini 138 that comprise heads 140. One of each of the pair of pivots 136 is positioned in an associated one of the penetrations 32 with the heads 140 extending past the penetration 32. Each of the pair of pivots 136 may be comprised of steel. Preferably, each of the pair of pivots 136 is comprised of hardened steel.

A rod 142 that is cylindrical and has a pair of ends 144, with each of the pair of ends 144 comprising a catch 146, is positioned in and through the tubular extension 70 of the plate 64 and the orifices 48 of the pair of projections 46, such that the catches 146 are positioned to secure the rod 142 in the tubular extension 70 and the orifices 48 to hingedly secure the latch 62 to the collar 12. The rod 142 may be comprised of a single piece of steel. Preferably, the rod 142 is comprised of a single piece of hardened steel.

In use, the device 10 is positioned such that the user can insert a trailer hitch into the tube 14. The hole 50 is positioned in the bottom 52 of the tube 14 to accept the screw 54 such that the hitch is fixed in a desired position by tightening the screw 54 into the hole 50. The pair of pins 118 is positioned to engage the holes in the hitch receiver when the pair of biasers 90 contacts the pair of pins 118 as the latch 62 is moved to a closed position. The pair of pins 118 is positioned to disengage from the holes in the hitch receiver when the pair of extractors 102 engages the actuator ends 124 of the pins 118 as the latch 62 is moved to an open position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A trailer hitch attachment device, said device comprising:
   a collar, said collar comprising;
     a tube,
     a pair of alignment blocks, one of each said pair of alignment blocks being coupled to a left side and a right side of said tube,
     each of said pair of alignment blocks having a channel, said channels being parallel to a longitudinal axis of said tube, said channels defining an upper guide and a lower guide;
   a latch, said latch being hingedly coupled to said tube, said latch comprising:
     a plate, said plate being flat,
     a pair of transitions, said pair of transitions being coupled to said plate,
     a pair of wings, one of each said pair of wings being coupled to an associated one of said pair of transitions,
     a pair of biasers, one of each said pair of biasers being coupled to an inside surface of an associated one of said pair of wings, and
     a pair of extractors, one of each said pair of extractors being coupled to said inside surface of an associated one of said pair of wings;
   a pair of pins, each of said pair of pins having a cylindrical body, a curved end, an actuator end, and a pivot hole, one of each of said pair of pins being positioned in an associated one of said channels with said curved ends extending toward said tube and with said actuator end positioned proximate to a back end of said tube; and
   a pair of pivots, said pair of pivots being cylindrical, each of said pair of pivots being coupled to and extending from an associated one of said upper guides, through an associated one of said pivot holes and coupled to an associated one of said lower guides.

2. The device of claim 1, further including said tube having a square profile when viewed along said longitudinal axis.

3. The device of claim 1, further including each of said pair of alignment blocks having a penetration, said penetrations being perpendicular to said channels, said penetrations being proximate to said back end of said tube.

4. The device of claim 1, further comprising:
a tab, said tab being coupled to and positioned on a top of said tube proximate to said back end, said tab having an opening;
a slot, said slot being positioned in said plate, said slot being complimentary to said tab, said slot being positioned proximate to a rear edge of said plate, said slot being parallel to said longitudinal axis; and
wherein said slot is positioned to accept said tab when said latch is in a closed position, and wherein said opening in said tab is positioned to accept a keeper or lock to secure said latch in the closed position.

5. The device of claim 1, further comprising:
a first coupler, said first coupler being coupled to and positioned on a top of said tube proximate to a front of said tube; and
a second coupler, said second coupler being complimentary to said first coupler, said second coupler being coupled to a hinge edge of said plate.

6. The device of claim 5, further comprising:
said first coupler being a pair of projections, each of said pair of projections having an orifice;
said hinge edge being a tubular extension of said plate, said tubular extension being complimentary to said orifices of said pair of projections; and
a rod, said rod being cylindrical and having a pair of ends, each of said pair of ends comprising a catch, said rod being positioned in and through said tubular extension of said plate and said orifices of said pair of projections, wherein said catches are positioned to secure said rod in said tubular extension and said orifices to hingedly secure said latch to said collar.

7. The device of claim 1, further comprising:
a hole, said hole being positioned in a bottom of said tube, said hole being threaded; and
a screw, said screw being complimentary to and positioned in said hole, said screw having a head and a tail, said tail being threaded, said head having an indentation, said indentation being hexagonally shaped.

8. The device of claim 1 further comprising:
said pair of transitions being flat and having an inside edge, one of each said inside edges being coupled to an associated one of a pair of opposing edges of said plate, such that said pair of transitions extend toward a bottom of said tube; and
each of said pair of wings being flat and having a triangular end and a straight end, each of said straight ends being coupled to an associated one of a pair of outside edges of said pair of transitions, such that said pair of wings extend toward said bottom of said tube perpendicularly to said plate.

9. The device of claim 8 further comprising:
one of each said inside edges being coupled to an associated one of said pair of opposing edges of said plate at a 55 degree angle relative to said plate; and
each of said straight ends being coupled to an associated one of said pair of outside edges of said pair of transitions at a 35 degree angle relative to said transition.

10. The device of claim 8 further including said pair of extractors being half-cylindrically shaped, each of said pair of extractors being positioned on said inside surface proximate to an associated one of said triangular ends.

11. The device of claim 10 further including said pair of extractors comprising a third set of extrusions protruding from said inside surface.

12. The device of claim 1 further including said pair of biasers being half-cylindrically shaped, each of said pair of biasers being positioned parallel to an associated one of a front rim of an associated one of said pair of wings.

13. The device of claim 12 further including said pair of biasers comprising a first set of extrusions protruding from said inside surface.

14. The device of claim 1 further including a pair of locks, one of each said pair of locks being coupled to said inside surface of an associated one of said pair of wings, said pair of locks being half-cylindrically shaped, each of said pair of locks being positioned on said inside surface parallel to said straight end.

15. The device of claim 14 further including said pair of locks comprising a second set of extrusions protruding from said inside surface.

16. The device of claim 1, further including said latch, said collar, each of said pair of pins and each of said pair of pivots each being comprised of a single piece of steel.

17. The device of claim 1, further including said latch, said collar, each of said pair of pins and each of said pair of pivots each being comprised of a single piece of hardened steel.

18. The device of claim 1, further including a handle, said handle being coupled to said plate.

19. The device of claim 18, further including said handle being coupled to a rear edge of said plate.

20. The device of claim 18, further including said handle being an arcuate extension of a rear edge of said plate, said arcuate extension extending away from said top, wherein said handle is positioned to facilitate movement of said latch to a closed position.

21. The device of claim 1, further including a pair of pulls, one of each said pair of pulls being coupled to a front rim of an associated one of said pair of wings.

22. The device of claim 21, further including said pair of pulls comprising extensions of said pair of wings, wherein said pair of pulls is positioned to facilitate movement of said latch to an open position.

23. The device of claim 1, further including said curved end being perpendicular to said cylindrical body.

24. The device of claim 1, further including said curved end being tapered.

25. The device of claim 1, further including said pivot hole comprising a loop, said loop being coupled proximate to said actuator end and extending from said cylindrical body away from said curved end.

26. The device of claim 1, further including each of said pair of pins having a stop positioned proximate to said curved end.

27. The device of claim 1, further including said actuator end comprising a block coupled to said cylindrical body, said block having an opposing pair of tapered faces.

28. The device of claim 1, further including each of said pair of pivots having a pair of termini, said pair of termini comprising heads, one of each said pair of pivots being positioned in an associated one of said penetrations with said heads extending past said penetration.

29. A trailer hitch attachment device, said device comprising:
a collar, said collar comprising;
a tube, said tube having a square profile when viewed along a longitudinal axis,
a pair of alignment blocks, one of each said pair of alignment blocks being coupled to a left side and a right side of said tube, each of said pair of alignment blocks having a channel, said channels being parallel to said longitudinal axis, said channels defining an upper guide and a lower guide, each of said pair of alignment blocks having a penetration, said penetrations being perpendicular to said channels, said penetrations being proximate to a back end of said tube, a tab, said tab being coupled to and positioned on a top of said tube proximate to said back end, said tab having an opening, a first coupler, said first coupler being coupled to and positioned on said top of said tube proximate to a front of said tube, said first coupler being a pair of protections, each of said pair of projections having an orifice, said collar being comprised of a single piece of steel, said collar being comprised of a single piece of hardened steel, a hole, said hole being positioned in a bottom of said tube, said hole being threaded, a screw, said screw being complimentary to and positioned in said hole, said screw having a head and a tail, said tail being threaded, said head having an indentation, said indentation being hexagonally shaped, and wherein said hole is positioned in said bottom of said tube to accept said screw such that a trailer hitch complimentary to said tube can be inserted into said tube securing said collar to said hitch in a desired position by tightening said screw into said hole;

a latch, said latch being hingedly coupled to said tube, said latch comprising:

a plate, said plate being flat, a second coupler, said second coupler being complimentary to said first coupler, said second coupler being coupled to a hinge edge of said plate, said hinge edge being a tubular extension of said plate, said tubular extension being complimentary to said orifices of said pair of projections, a pair of transitions, said pair of transitions being coupled to said plate, said pair of transitions being flat and having an inside edge, one of each said inside edges being coupled to an associated one of a pair of opposing edges of said plate, each of said pair of transitions being coupled to an associated one of said pair of opposing edges edges, each of said pair of transitions being coupled to an associated one of said pair of opposing edges at 55 degree angle relative to said plate, such that said pair of transitions extend toward said bottom of said tube, a pair of wings, one of each said pair of wings being coupled to an associated one of said pair of transitions, each of said pair of wings being flat and having a triangular end and a straight end, each of said straight ends being coupled to an associated one of a pair of outside edges of said pair of transitions at a 35 degree angle relative to said transition, such that said pair of wings extend toward said bottom of said tube perpendicularly to said plate, a pair of biasers, one of each said pair of biasers being coupled to an inside surface of an associated one of said pair of wings, each of said pair of biasers being half-cylindrically shaped, each of said pair of biasers being positioned parallel to an associated one of a front rim of said pair of wings, said pair of biasers comprising a first set of extrusions protruding from said inside surface, a pair of locks, one of each said pair of locks being coupled to said inside surface of an associated one of said pair of wings, said pair of locks being half-cylindrically shaped, each of said pair of locks being positioned on said inside surface parallel to said straight end, said pair of locks comprising a second set of extrusions protruding from said inside surface, a pair of extractors, one of each said pair of extractors being coupled to said inside surface of an associated one of said pair of wings, said pair of extractors being half-cylindrically shaped, each of said pair of extractors being positioned on said inside surface proximate to respective one of said triangular ends, said pair of extractors comprising a third set of extrusions protruding from said inside surface, said latch being comprised of a single piece of steel, said latch being comprised of a single piece of hardened steel, a slot, said slot being positioned in said plate, said slot being complimentary to said tab, said slot being positioned proximate to a rear edge of said plate, said slot being parallel to said longitudinal axis, wherein said slot is positioned to accept said tab when said latch is in a closed position, and wherein said opening in said tab is positioned to accept a keeper or lock to secure said latch in a closed position, a handle, said handle being coupled to said plate, said handle being coupled to said rear edge of said plate, said handle being an arcuate extension of said plate, said arcuate extension extending away from said top, wherein said handle is positioned to facilitate movement of said latch to a closed position, and a pair of pulls, one of each said pair of pulls being coupled to said front rim of an associated one of said pair of wings, said pair of pulls comprising extensions of said pair of wings, wherein said pair of pulls are positioned to facilitate movement of said latch to an open position;

a pair of pins, each of said pair of pins having a cylindrical body, a curved end, an actuator end, and a pivot hole, each of said pair of pins being positioned in an associated one of said channels with said curved ends extending toward said tube and with said actuator end positioned proximate to said back end, said curved end being perpendicular to said cylindrical body, said curved end being tapered, said pivot hole comprising a loop coupled proximate to said actuator end and extending from said cylindrical body away from said curved end, each of said pair of pins having a stop positioned proximate to said curved end, said actuator end comprising a block coupled to said cylindrical body, said block having an opposing pair of tapered faces, each of said pair of pins being comprised of a single piece of steel, each of said pair of pins being comprised of a single piece of hardened steel;

a pair of pivots, said pair of pivots being cylindrical, each of said pair of pivots being coupled to and extending from an associated one of said upper guides, through an associated one of said pivot holes and coupled to an associated one of said lower guides, each of said pair of pivots having a pair of termini, said pair of termini comprising heads, one of each said pair of pivots being positioned in an associated one of said penetrations with said heads extending past said penetration, each of said pair of pivots being comprised of steel, each of said pair of pivots being comprised of hardened steel;

a rod, said rod being cylindrical and having a pair of ends, each of said pair of ends comprising a catch, said rod being positioned in and through said tubular extension of said plate and said orifices of said pair of projections, wherein said catches are positioned to secure said rod in said tubular extension and said orifices to hingedly secure said latch to said collar, said rod being comprised of a single piece of steel, said rod being comprised of a single piece of hardened steel; and wherein said device is positioned such that the user can insert a trailer hitch into said tube with said hole being positioned in said bottom of said tube to accept said screw such that the hitch is fixed in a desired position by tightening said screw into said hole, and wherein said pair of pins are positioned to engage the holes in the hitch receiver when said pair of biasers contact said pair of pins as said latch is moved to a closed position, and wherein said pair of pins are positioned to disengage from the holes in the hitch receiver when said pair of extractors engage said actuator ends as said latch is moved to an open position.

\* \* \* \* \*